J. BROUGHTON.
Fire-Escape.
No. 203,240. Patented May 7, 1878.
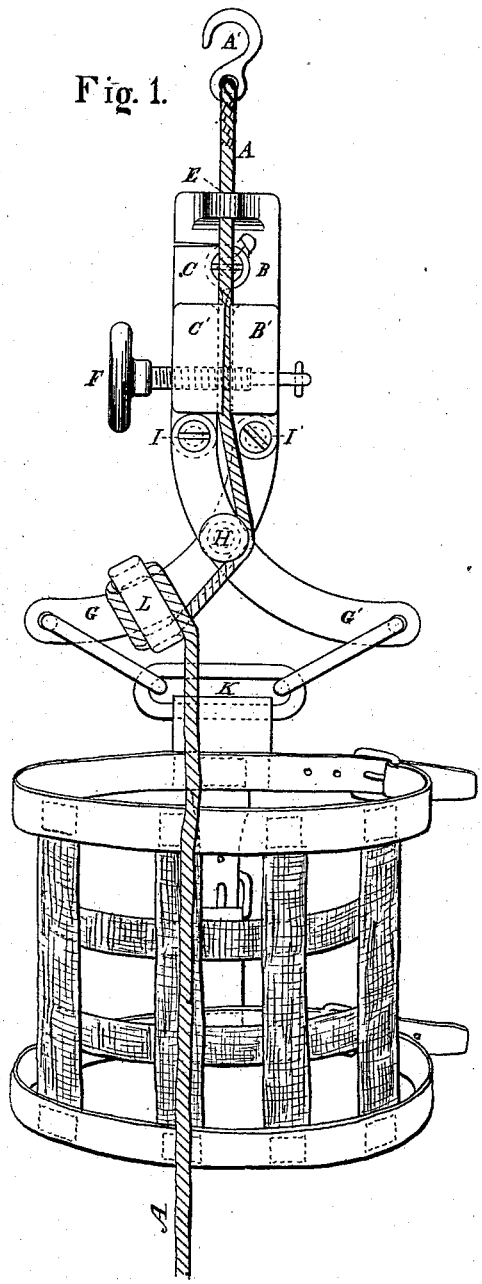
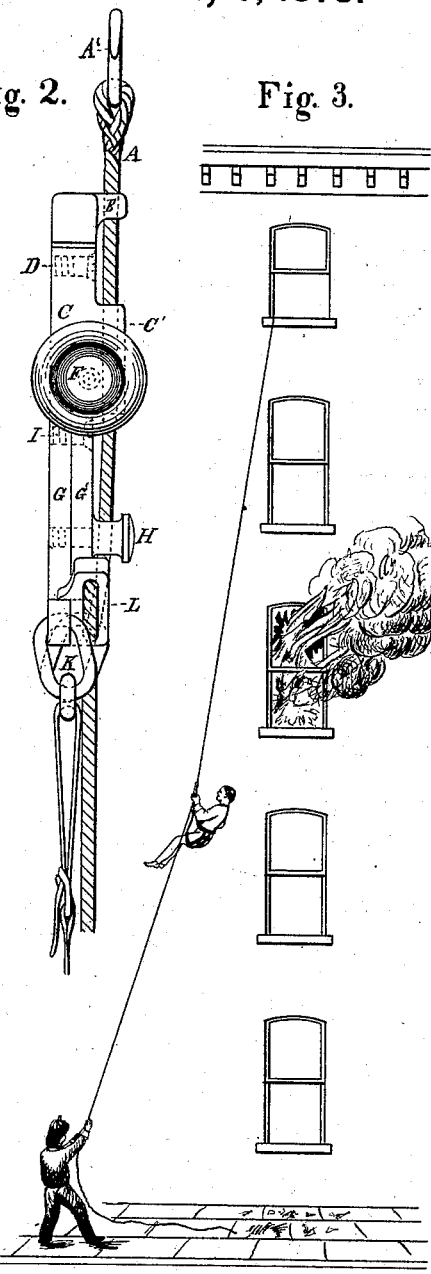
WITNESSES.
INVENTOR.

UNITED STATES PATENT OFFICE.

JAMES BROUGHTON, OF HOPE VALLEY, RHODE ISLAND.

IMPROVEMENT IN FIRE-ESCAPES.

Specification forming part of Letters Patent No. 203,240, dated May 7, 1878; application filed November 1, 1877.

*To all whom it may concern:*

Be it known that I, JAMES BROUGHTON, of Hope Valley, in the county of Washington and State of Rhode Island, have invented certain new and useful Improvements in Fire-Escapes, which are fully set forth in the following specification and accompanying drawings, making part thereof.

The object of this invention is to provide an apparatus for fire-escapes, or any other purpose for which it may be applied, capable of adjustment so as to clamp the rope within any desired pressure, under perfect control of the operator; and consists in the combination of a suspending-rope and a pair of pivoted clamping-jaws or gripers with a regulating hand-screw, said clamps being operated by hinged levers and having a secondary frictional device, which is more fully hereinafter set forth and described, bearing upon the slack end of the rope.

It also consists of the devices above set forth, in combination with a suitable flexible apparatus, forming a harness and seat for the occupant, with straps to buckle or hook or otherwise fasten securely around the person occupying it, said belts being connected together by strips and attached to the pressure-levers of the rope-clamps by a chain or otherwise.

Figure 1 is a front elevation of my invention. Fig. 2 is a side view of the same. Fig. 3 is a perspective view of the escape in operation.

A is a suspending-rope, adapted, by the hook A' or otherwise, to be readily secured to the upper part of the building, so as to hang with the mechanism of the escape adjacent to windows or balconies. B and C are the two clamping-jaws or gripers, pivoted to each other at D, and bearing upon their front faces two grooved brake-blocks, B' C', between which the rope passes. E is an eye, through which the rope is also passed as a guide. It serves, further, to keep the apparatus vertical.

The gripers B' C' are furnished with a tightening-screw, F, threaded to engage with corresponding threads in one of the clamping-jaws, and made cylindrical where it passes through the other, and is provided with a hand-piece, a burr-wheel, or otherwise, so arranged that any desired degree of pressure upon the rope may be obtained. G G' are two hinged levers, pivoted to each other at H, and to the clamping-jaws B C at I I', in such a manner that the weight of a person suspended by the chain K or otherwise from the ends of the levers G G' will act to clamp the rope between the brake-blocks B' C'.

The screw F serves, when desired, to increase or decrease the distance between the gripers B' C', and to regulate and limit their pressure upon the rope A exerted through the levers G G'.

It is obvious that the joint I' may be dispensed with, or, in other words, that the parts B and G may be rigidly connected, the parts C and G', with the pivots H, I, and D, giving sufficient play to the gripers B' C'.

It is important to supplement the pressure apparatus, acted upon by the weight of the occupant and already described, by suitable friction devices connected with the free end of the rope, and capable of adjustment or manipulation by the person making or conducting the descent.

The means I have adopted for this purpose consists of a friction-bar, L, secured to the lever G or G', through or around which the rope passes, bearing also upon the bolt H. A variable resistance is thus opposed to the descent of the apparatus, and the operator may pay out or check the movements of the rope at pleasure.

Various modifications of this feature of my invention are apparent.

I also provide a suitable chair and harness, by means of which the occupant may be secured against falling, and given the use of one or both hands. Such apparatus may be secured to the levers G G' in any convenient manner.

It is obvious that individuals escaping can suspend as indicated in this apparatus, secure themselves thereto, adjust the friction devices, attend the rope, and conduct themselves down, or any other person can do it, and move the apparatus and occupant by the free end of the rope to any point best to avoid the fire in the descent.

A cord should be secured to the upper part of the apparatus, by which it may be drawn up again for repeated use without lifting the rope A. During such ascent the clamp and friction devices should, of course, be slackened or thrown out of contact with the rope.

Having thus described my improvements in fire-escapes, I claim—

1. In a fire-escape, the combination of a suspending-rope, a pair of pivoted gripers operated by hinged levers, and a regulating-screw with a secondary friction apparatus, adapted to engage with the free end of the rope, substantially as set forth.

2. The combination of the rope A, gripers B' C', levers G G', and screw F with a suitable seat and harness for the operator, and secondary friction device, enabling said operator to control the speed of descent, substantially as and for the purposes set forth.

JAMES BROUGHTON.

Witnesses:
J. G. PERRY,
M. F. PERRY.